United States Patent
Jensen

(10) Patent No.: US 7,441,412 B2
(45) Date of Patent: Oct. 28, 2008

(54) HEAT TRANSFER SYSTEM AND METHOD

(76) Inventor: Tim Allan Nygaard Jensen, 2525 Millington Dr., Plano, TX (US) 75093

( * ) Notice: Subject to any disclaimer, the term of this patent is extended or adjusted under 35 U.S.C. 154(b) by 576 days.

(21) Appl. No.: 11/043,763

(22) Filed: Jan. 26, 2005

(65) Prior Publication Data

US 2006/0162354 A1 Jul. 27, 2006

(51) Int. Cl.
F28C 1/00 (2006.01)
F28D 9/00 (2006.01)
F25D 23/12 (2006.01)

(52) U.S. Cl. .................. 62/121; 62/171; 62/259.4; 62/305; 261/27

(58) Field of Classification Search ............ 62/121, 62/171, 259.4, 304, 150, 305, 310, 316; 261/27
See application file for complete search history.

(56) References Cited

U.S. PATENT DOCUMENTS

| | | | |
|---|---|---|---|
| 2,142,423 A | 1/1939 | Timmis |
| 2,231,856 A | 2/1941 | Wetter |
| 2,278,242 A | 3/1942 | Chapman |
| 2,655,795 A | 10/1953 | Dyer |
| 2,995,018 A | 8/1961 | Dempsey, Jr. |
| 3,108,451 A | 10/1963 | Clifford |
| 3,182,718 A | 5/1965 | Goettl |
| 3,427,005 A | 2/1969 | Kuykendall |
| 3,613,392 A | 10/1971 | Tucci |
| 3,859,818 A | 1/1975 | Goettl |
| 3,872,684 A | 3/1975 | Scott |
| 3,984,995 A | 10/1976 | Starr et al. |
| 4,028,906 A | 6/1977 | Gingold et al. |
| 4,066,118 A | 1/1978 | Goettl |
| 4,067,205 A | 1/1978 | Mayhue |
| 4,170,117 A | 10/1979 | Faxon |
| 4,182,131 A | 1/1980 | Marshall et al. |
| 4,199,955 A | 4/1980 | Jonsson |
| 4,204,409 A | 5/1980 | Satama |
| 4,212,172 A | 7/1980 | Manno |
| 4,240,265 A | 12/1980 | Faxon |
| 4,266,406 A | 5/1981 | Ellis |
| 4,274,266 A | 6/1981 | Shires |
| 4,290,274 A | 9/1981 | Essex |
| 4,353,219 A | 10/1982 | Patrick, Jr. |
| 4,365,483 A | 12/1982 | Binger |

(Continued)

OTHER PUBLICATIONS

Premier Industries, Inc., "Precoolers", pp. 1-2, no date.

*Primary Examiner*—Marc E Norman
(74) *Attorney, Agent, or Firm*—Grady K. Bergen; Griggs Bergen LLP

(57) ABSTRACT

A heat transfer system is provided having an air-cooled heat exchanger system. The heat exchanger system has an evaporator, condenser, compressor and a fan for forcing air over a heat exchange surface for effecting heat transfer. A mist generator having at least one nozzle directs a stream of fine mist or atomized liquid coolant into the air. The mist generator is coupled to a supply of liquid coolant. A controller controls the degree of mist or atomized coolant generated by the mist generator. A filter element positioned between the at least one nozzle and the heat exchange surface captures droplets of liquid coolant. The at least one nozzle is spaced apart from the filter element for directing the stream directly into the air surrounding the filter element.

22 Claims, 7 Drawing Sheets

U.S. PATENT DOCUMENTS

| | | | |
|---|---|---|---|
| 4,373,346 A | 2/1983 | Hebert et al. | |
| 4,505,327 A | 3/1985 | Angle et al. | |
| 4,559,789 A * | 12/1985 | Riek | 62/157 |
| 4,612,778 A | 9/1986 | Medrano | |
| 4,672,817 A * | 6/1987 | Croce | 62/183 |
| 4,685,308 A | 8/1987 | Welker et al. | |
| 4,730,462 A | 3/1988 | Rogers | |
| 4,918,943 A | 4/1990 | Faust | |
| 4,938,035 A | 7/1990 | Dinh | |
| 4,939,907 A * | 7/1990 | Taylor | 62/95 |
| 5,003,789 A * | 4/1991 | Gaona et al. | 62/304 |
| 5,117,644 A | 6/1992 | Fought | |
| 5,285,651 A | 2/1994 | Marine | |
| 5,297,397 A | 3/1994 | Pointer | |
| 5,553,463 A | 9/1996 | Pointer | |
| 5,605,052 A | 2/1997 | Middleton et al. | |
| 5,695,117 A | 12/1997 | Sizemore et al. | |
| 5,701,708 A | 12/1997 | Taraba et al. | |
| 5,701,748 A * | 12/1997 | Phelps et al. | 62/91 |
| 5,702,130 A | 12/1997 | Jostein | |
| 6,048,816 A | 4/2000 | Brown et al. | |
| 6,237,359 B1 | 5/2001 | Hebert | |
| 6,253,565 B1 | 7/2001 | Arledge | |
| 6,463,751 B1 | 10/2002 | Teller | |
| 6,574,975 B2 * | 6/2003 | Bourne et al. | 62/171 |
| 6,619,059 B1 | 9/2003 | Johnson, Sr. | |
| 6,871,507 B1 * | 3/2005 | Goldsmith | 62/183 |
| 2002/0073720 A1 | 6/2002 | Bourne et al. | |
| 2003/0213253 A1 | 11/2003 | James | |
| 2004/0129014 A1 | 7/2004 | Richman et al. | |
| 2004/0211208 A1 | 10/2004 | Permetti | |
| 2006/0116791 A1 * | 6/2006 | Ravula et al. | 700/284 |

* cited by examiner

HEAT TRANSFER SYSTEM AND METHOD

TECHNICAL FIELD

The invention relates generally to air-cooled heat transfer devices and methods of using such devices.

BACKGROUND

Evaporative cooling has been known for centuries and is well understood. And evaporative or "swamp" coolers for the home and business have been available for many decades. Mechanical refrigeration with its many advantages over evaporative coolers in moderate to humid climates has been understood and improved upon since the beginning of the last century.

Recently the particular advantages of combining evaporative cooling with mechanical cooling, and more specifically with air-cooled condensers, have been disclosed. Air conditioners that reject heat through air-cooled condensers are inherently less energy efficient than their larger counterparts that reject heat to a body of water or to condenser water and cooling towers. This advantage of water cooled over air cooled has to do with the thermodynamics or energy transfer of water evaporation compared to convective heat or energy transfer from the air-cooled condenser.

The unfortunate reality of the air-cooled condensing units found on most commercial buildings and almost all residences is that the hotter the outdoor temperature gets the less cooling capacity the unit can provide and the more electricity it will consume. The cooling capacity decrease is approximately linear with rising outdoor temperature. And since energy consumption increase is also roughly linear, the efficiency-cooling capacity divided by energy input-is hit doubly hard.

Evaporating a stream or mist of water into the airflow through the condenser is an effective means to reduce the temperature of that airflow and greatly improve the heat transfer from the refrigerant through the condenser to the cooler airflow. The evaporation increases the relative humidity of the airflow through the condenser coils, but it is of no consequence since it remains outside. There is a net increase in the consumption of water compared to the water that is typically used in the generation of electricity. However, the environmental benefits and fuel savings weigh heavily in favor of widespread adoption of the technology.

Numerous inventors have observed these advantages and have disclosed their ideas in the prior art. Most would improve the operating efficiency of the condensing unit initially at least, but they suffer various shortcomings.

Gingold et al (U.S. Pat. No. 4,028,906) discloses a misting or fogging invention that runs whenever the compressor in the condensing unit runs. It uses a fogging nozzle that sprays the water mist directly into the condenser airflow. Gingold recognizes the need to protect the condenser coil from the scaling or build-up of calcium carbonate and other minerals and shows an inline detergent dispenser. It is not likely that this would prove to be an effective inhibitor. In the best circumstance it would add operating cost and detergent would either accumulate or run-off. And water spray or mist at all operating conditions is not warranted since the maximum benefit is achieved during the hottest conditions.

Welker et al (U.S. Pat. No. 4,685,308) improves upon Gingold's invention by adding temperature sensitive response and thereby limiting misting operation to periods of time when it will be most effective. While this reduces the overall water quantity used and also the scaling, he still includes an inline filter to reduce the scale build-up. Welker also raises the possibility of using a reverse osmosis filter to remove minerals. This is quite effective, but costly for the flowrates required and labor intensive to install. It would only be economically attractive where there are other required uses for the filtered water or under critical circumstances.

Manno (U.S. Pat. No. 4,212,172) discloses a different approach that eliminates the need for inline water filters. Instead of misting or spraying the water directly onto the coils, he discloses a box with water vanes and filters. This has proved to be effective at stopping the water mist from reaching the condenser coils. Manno's filter unit, however, is a relatively complex open box attached by screws to the condensing unit. The unit utilizes an internal arrangement wherein water is directed over water vanes to create a waterfall through which turbulent air passes before reaching the filter. The system is more complicated than need be, and therefore more expensive than necessary. And its configuration requires multiple units for two, three, and four sided condenser coil units. It can also be expected to increase the airflow resistance or pressure drop across the coil. This will reduce the total airflow and increase the condenser fan power consumption. This will decrease the benefits of the water evaporation.

BRIEF DESCRIPTION OF THE DRAWINGS

For a more complete understanding of the present invention, reference is now made to the following descriptions taken in conjunction with the accompanying figures, in which:

FIG. 2b is a side elevational view of the condenser of FIG. 2a;

FIG. 6b is a side elevational view of the condenser unit and housing of FIG. 6a;

FIG. 7b is a top plan view of the condenser unit of FIG. 7a.

DETAILED DESCRIPTION

Figure 1:
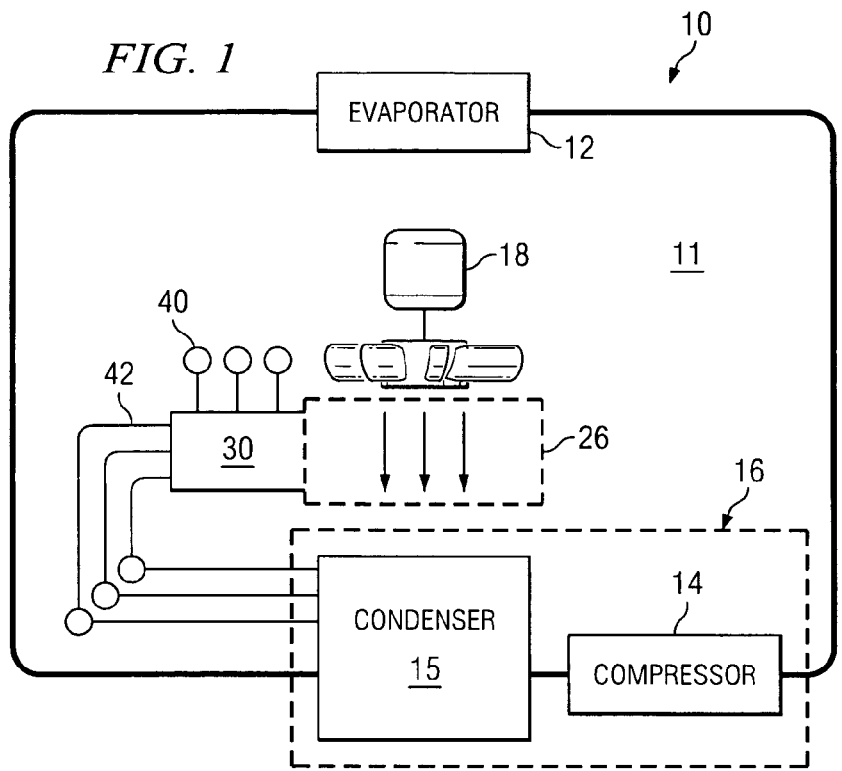
FIG. 1 is a schematic of a heat transfer system.

Referring to the schematic of FIG. 1, a heat transfer system 10 is shown. The system 10 may include an air-cooled heat exchanger unit 11 in the form of an air conditioning or heat pump unit for both residential and commercial applications. Such units may include an evaporator 12, a compressor 14 and a condenser 15 or condensing unit 16 within a closed system containing a refrigerant. The units also may include a fan or blower 18 for forcing air over the condenser 15. Air conditioners and heat pumps and their operation are well known in the art. Heat pumps are similar to air-conditioning-only units, but may provide both heating and cooling by reversing system refrigerant flow, such as through a reversing valve, to provide the desired heating or cooling operation.

The heat transfer system 10 may be a unitary system, such as a commercial rooftop unit, comprised of both condensing unit 16 and evaporator 12. Alternatively, it may be a split system with condensing unit 16 located outdoors and the evaporator indoors.

Figure 2B:
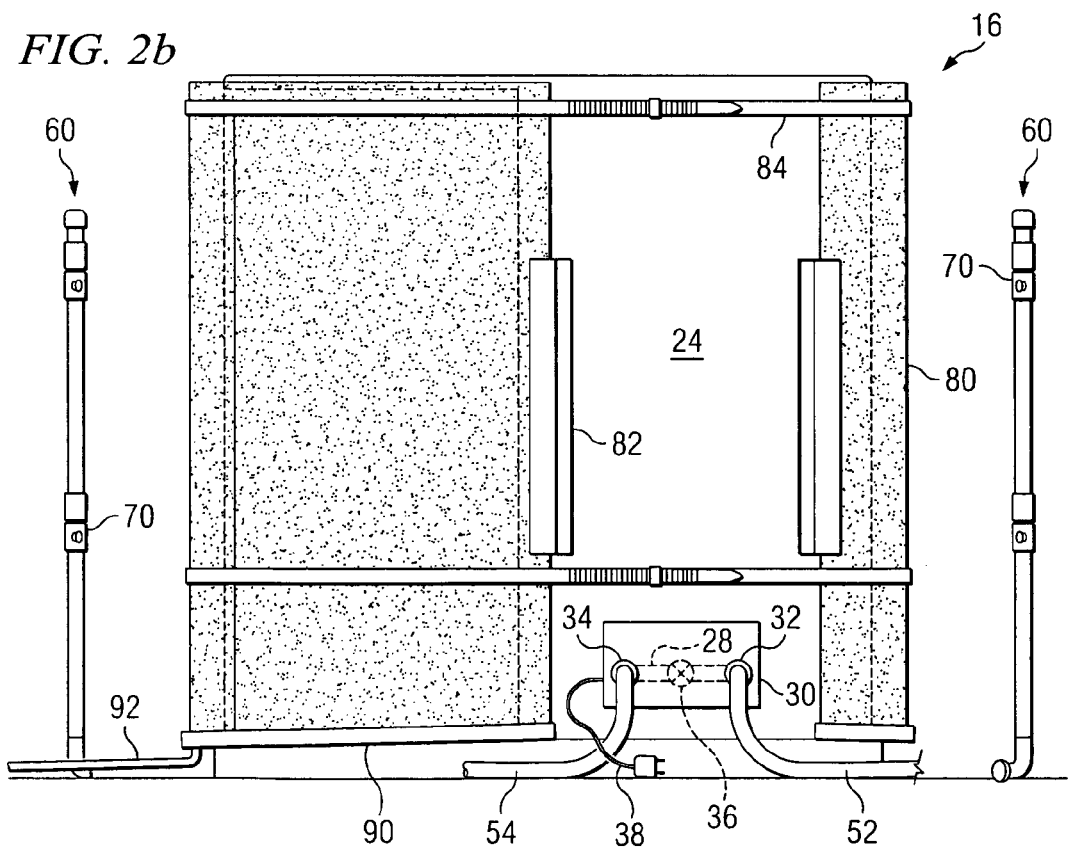
Figure 2A:
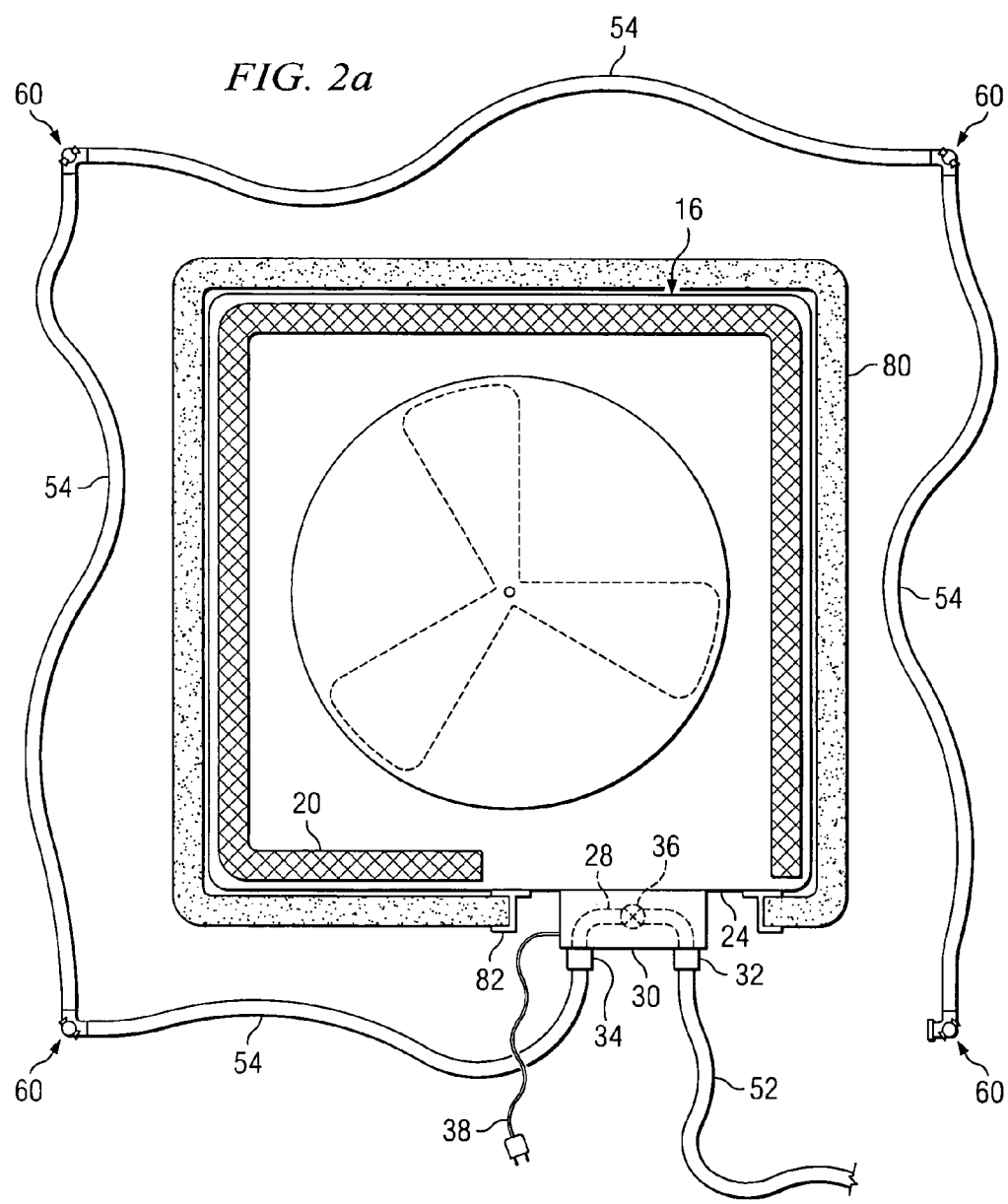
FIG. 2a is a top plan view of a condenser unit employing an air-cooled subsystem.

Referring to FIGS. 2a and 2b, the condensing unit 16, typically located outdoors for air conditioners, is shown with the fan 18, which draws ambient or outdoor air through a condenser coil 20. In air conditioning operations, heat from the air conditioned space is rejected to this outside air flow where it is discharged up through the fan opening 22. In the embodiment shown, the coil 20 is arranged in a generally square or rectangular configuration 20, extending fully along three generally planar sides and partially along the planar fourth side. The condenser coil 20 may have other configurations as well, such as a circular or oval shape, with the configurations having planar and non-planar shaped sides. As used herein, the expression "non-planar" is meant to encompass both curved shapes and the combination of two or more planar shapes that are non-coplanar, such as may be formed by angled or perpendicular planes. The portion 24 of the condensing unit 20 that does not have a coil may be occupied by the compressor, power supply (not shown) and other components for the system 10.

The heat transfer system 10 includes an air-cooling subsystem 26 (FIG. 1) for cooling the air used with the air conditioning or heat exchanger unit 11. The subsystem 26 includes a liquid coolant flow regulator 28. A controller 30 is coupled to the regulator 28. The regulator 28 has a liquid coolant inlet 32 and a liquid coolant outlet 34. The regulator 28 may include a valve 36, which may be a solenoid valve or other operable flow regulating device or valve to regulate the flow of liquid coolant from inlet 32 to outlet 34. The valve 36 may be a simple on/off valve, or it may be variable or adjustable to regulate the degree of flow therethrough.

The liquid coolant is typically water, although the invention may have application to systems that may employ other coolants as well. The water may be supplied from a variety of sources. For residential applications, however, the water may be supplied from an externally-located faucet or spigot associated with the home or dwelling utilizing the system 10, for connection to a garden hose or the like. Indeed, the inlets and outlets 32, 34 may be provided with threaded couplings sized and configured for connection to conventional garden hoses and the like.

The liquid coolant source may also include non-potable water. This may include collected rainwater, water from an open reservoir (egs. lakes, ponds, etc.) or gray water. Gray water is typically water waste from sinks, showers, bathtubs, but typically not from urinals and toilets. This non-potable water is finding more frequent use thanks to sustainability movements such as the U.S. Green Building Council's "Leadership in Energy and Environmental Design" (LEED) program. The water may be filtered and used for irrigation, sometimes to flush toilets, and other uses where potable water is not required. The non-potable water may be filtered, if necessary, and pumped for use in the present invention.

The controller 30 may include a control or logic board, microprocessor or other device, which may be programmed or configured to provide various control and monitoring functions as described herein. The subsystem 26 may be powered through an electrical connection, such as a conventional power cord 38, which may be configured for coupling to a power outlet, such as 120V, provided with the associated building or dwelling. Alternatively, the subsystem components may be hardwired separately or with the components of the heat exchanger unit 11. The subsystem 26 may also be provided with a battery power source.

The controller 30 may have various sensors 40, 42 (FIG. 1) for detecting and monitoring ambient and system conditions. These may include but are not limited to sensors for detecting and monitoring whether the unit 11 or condenser unit 16 is running or off, sensors for monitoring the outdoor or ambient dry-bulb and wet-bulb temperatures (from which outdoor relative humidity can be determined) or humidity, the length of time the compressor 14 has been running, the current drawn by the compressor 14 or the entire unit 11, the compressor discharge pressure, the liquid refrigerant temperature, or whether a power providing entity or other entity has provided a signal or instruction, such as for electricity demand curtailment, which is discussed in more detail later on.

Because the liquid refrigerant temperature of the unit 11 is directly related to the compressor pressure, which in turn is determined by the outdoor temperature, it could be used as a single measure of how hard the condensing unit is working and whether air cooling by the subsystem 26 is necessary. The controller output or response to these inputs would then be utilized to activate or adjust the degree of air cooling by the subsystem 26.

The controller 30, particularly when used with heat pumps, may have the capability of locking out or halting the misting operation, such as when the outdoor temperature is below 70° F. (adjustable). This would ensure that no mist would flow when the unit is operating in heating mode or when little advantage is derived from such misting.

Water may be supplied to the inlet 32 through a flexible hose 52, such as a length of garden hose, connected to a faucet or spigot associated with the house or dwelling (not shown). Water may also be supplied through a dedicated water line, which may be a flexible or non-flexible conduit. After the water passes through the regulator 28, it discharges through the outlet 34 and into a distribution conduit or hose 54. This hose conveys the water to a first mister post 60, which may be a rigid conduit or pipe. Since the water flow rate may be quite low, about 8 to 15 gallons per hour, more typically 10 to 12 gallons per hour, on a typical 5-ton residential air conditioning unit, a single hose may be adequate to supply all of the mister posts.

Alternatively, the controller may have a manifold or multiplexer that supplies water to two or more individual hoses: one hose to each mister post. And if the regulator 28 is equipped with multiple solenoid valves, this method can be used to stage the misting at the condensing unit, as is discussed later on. If the staging of mist is not required, then the multiplexing can also be achieved with the use of a flow splitter or manifold on the hose 54 or outlet 34 downstream of the regulator 28.

The regulator 28 and/or controller 30 may be positioned on the ground or support surface adjacent to the condenser unit 16 or they may be mounted to the condensing unit 16 for a more orderly installation. The distribution hoses 52, 54 coupled to the inlets and outlets 32, 34 may be allowed to rest on the ground or other surrounding support surface, such as a rooftop.

In the embodiment shown in FIGS. 2a and 2b, there are four mister posts 60 that are spaced apart about the perimeter of the condensing unit 16. These are shown in a generally upright or vertical orientation and generally spaced outward from, but generally proximate to the corners of the unit 16, which is shown having a generally square configuration. Other locations for the mister posts 60 could be used, as well. The posts 60 may be connected to the water supply via flexible lengths of hose 54 having couplings such as those of a garden hose or the like. This allows the user flexibility in selecting the location of the hoses with respect not only the condensing unit 16, but also to fences, walls, landscaping, other condensing units, and other obstacles located around or surrounding area to the condensing unit 16. The posts may be located approximately 6 to 24 inches, more typically 12 to 16 inches, from the condensing unit to maximize the amount of mist evaporation, but this distance may be varied to account for wind or other factors.

Figure 3A:
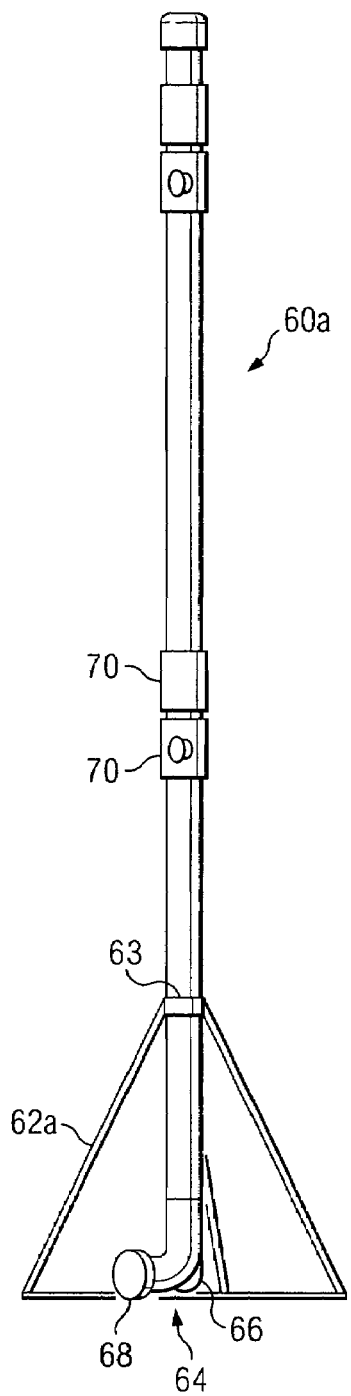
FIG. 3a is an elevational view of a mister post having a support stand.
Figure 3B:
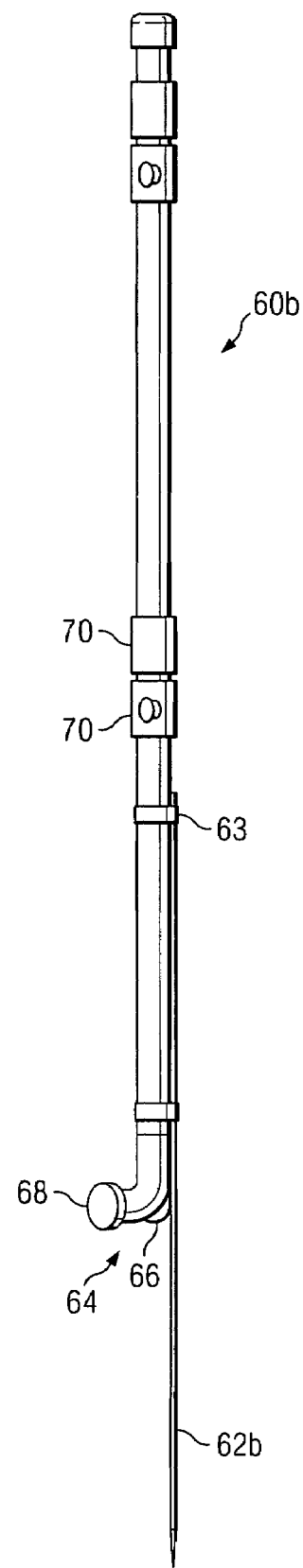
FIG. 3b is an elevational view of a mister post having a support stake.
Figure 3C:
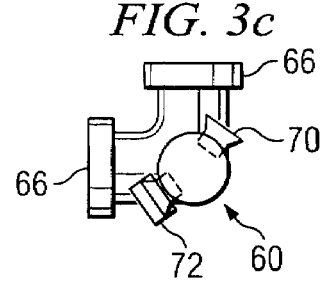
FIG. 3c is a top plan view of mister post.

The mister posts 60 are shown in more detail in FIGS. 3a-3c. FIGS. 3a and 3b show two side views of mister posts 60a, 60b, respectively. Both posts 60a, 60b constitute rigid conduits that may be formed from a variety of different materials, such as copper, PVC, etc. PVC or other materials used for the mister posts 60 that may be subject to degradation from ultraviolet radiation or from prolonged outdoor exposure may be painted or treated to resist such degradation. Although the mister posts 60 are shown as being generally straight or linear in shape, they may have non-linear shapes as well. The posts 60 may be of a length so that they coextend or substantially coextend with the height of the condenser unit 16.

The mister posts 60 may be provided with a different support or mounting structure 62 depending upon the environment in which it is to be used. The supports 62 may be non-fixed so that the posts 60 may be moved and repositioned at selected locations, if desired. As shown in FIG. 3a, the post 60a is provided with a support or stand 62a for use on a generally non-penetrable surface, such as a rooftop or concrete areas, so that the post 62a may be held in a generally upright manner. In the embodiment shown, a tripod stand is used. If necessary, the support 62a may be bolted or otherwise secured or fastened to such surface or to the condensing unit 16 or other fixture.

As shown in FIG. 3b, the support 62b of the post 60b is in the form of a stake that may be inserted into the ground or other penetrable surface. This may be useful in residential condensing units that are often surrounded by grass or landscaping. Note that on commercial roofs, it is often a rooftop unit-comprised of both the condensing unit and refrigerant evaporator unit-that is installed. In this case the tripod mount 62a would still work well. Either of the mounts 62a, 62b may be secured to the post 60 by a securing device 63.

The posts 60 may also be fastened or mounted directly to the condensing unit 16 or heat exchange unit 11, if desired.

Each post 60 may be provided with a hose connection 64 having an inlet 66 and outlet 68. In the embodiment shown, the hose connection 64 is located at the lower end. Coupled to the inlet 66 and outlet 68 of each post 60 is a length of the flexible hose or conduit 54 which joins the outlet 68 to the inlet of the next adjacent post 60. In the case of the last post 60 (FIG. 2a) located furthest downstream, the second or outlet hose connection 68 can be capped off to prevent flow therethrough.

Located along the length of each post 60 are one or more mister nozzles 70. As shown in the embodiment of FIGS. 3a-3c, two or more sets of mister nozzles 70 are provided, each set being longitudinally spaced a distance from the other along the length of the post 60. The nozzles 70 of each set may be directed in different directions on generally opposite sides of the post 60 to produce a larger area of mist or atomized spray into the air. The nozzles may be directed into the air slightly away and not directly towards the condenser coil. This increases the effective travel path of the mist, which begins to evaporate and adiabatically cool the condenser airflow. Most of the mist is entrained into the airflow moving toward the condenser coil. The nozzles may be oriented so that the mist pattern does not come into contact with any structure where collecting or condensation of the mist may occur. The nozzles may provide a spray of fine mist or atomized water that is readily evaporated in the air immediately surrounding the filter element, as is discussed later on. Nozzles with a flow capacity of 0.3 to 0.7 gph, more typically around 0.5 gph, at typical water pressures are effective at producing a suitable atomized mist.

FIG. 3c shows a mister post 60 with a mister plug 72 used in place of the mister nozzle 70. The mister plug or plugs 72 may be used in instances where the condensing unit 16 does not have coil 20 on one side of the post 60 or where less mist is desired. They would also be useful in humid climates where maximum misting is not needed. The mister nozzles 70 and plugs 72 may be provided with threaded connections for coupling to corresponding connections on the post 60 to allow easy interchange or replacement, such as when the nozzles become clogged by scale or other debris.

Referring to FIGS. 2a and 2b, a non-framed flexible filter element 80 is provided to serve as a barrier to any unevaporated water mist discharged from the mister posts 60. As used herein, the expression "non-framed" may encompass both a flexible filter material without any framing structure or that may employ some type of framing structure but that is capable of flexing with the filter material to conform to non-planar shapes, as defined herein. The filter element may be formed from a layer or layers of woven or non-woven fiber material, such as those commonly used within the indoor air handling unit of air conditioning systems. Typically, such filters utilize a randomly oriented fiber pattern, although a non-random fiber pattern may be used as well. A variety of different materials may be used for the filter element, both natural and synthetic. Examples of filter material include fiberglass and polymeric materials, such as polypropylene, polyester, etc. The filter materials may be provided with or treated to provide an electrostatic charge, such as those used to attract dust particles. The thickness of the filter element may vary, but a thickness of from about ½ to 4 inches or more may be suitable, with from about 1 to about 2 inches being more typical. The filters may have a MERV rating of from 1 to about 12. Examples of suitable commercially available filter material products includes AMERGLAS™ Hammock Fiberglass Filter and PUROLATER™ Basic Efficiency Filter Media, both fiberglass and polymeric, available from Clarcor, Inc. Such materials may be supplied on rolls and cut to size and shape.

The flexibility of the filter element 80 allows it to conform to substantially all non-planar shapes of existing condensing units: round, oval, square, rectangular, etc. The filter element may be a continuous, single piece of material. And it can be easily trimmed with scissors to fit the variable height and perimeter of condenser coils. When the unit is on, the airflow itself may facilitate holding the filter in place against the condensing unit. Testing has shown that the overall airflow may be reduced less than five percent by the filter. The filter may be held in place without the use of a frame or housing structure. The filter element 80 may be held in place by brackets or clips 82 or other fastening devices. Alternatively, or in addition, the filter element may be held in place by the straps 84 or other securing devices that may extend around the perimeter of the condensing unit 16. The straps 84 may be provided with a fastening device, such as Velcro or hook and loop fastener or such as those used on self-locking cable ties.

Referring to FIG. 2a, the condenser coil 20 of the condensing unit 16 may be substantially covered by the flexible filter 80, which is shown wrapped around the sidewalls of the unit. As shown, the filter 80 overlays the entire length and width of the condenser coil 20. The filter may exhibit a strong attraction to the unevaporated water due to surface energy differences. The mist may have a strong tendency to "wet" the filter fibers. This natural attraction may be enhanced further through the use of filters with an electrostatic charge or an active electrostatic filter.

Referring to FIG. 2b, a drain channel 90 is shown for collecting liquid water dripping from the bottom of the filter 80. Although, the invention may minimize wasted water, some liquid water may collect, such as at times when the outdoor relative humidity is high. This overflow may be discharged through a drain pipe 92 to a selected location. For units in which the misting waterflow may be regulated, a sensor may be added near the inlet to drain pipe 92. When heavy run-off is indicated by the sensor, the controller 30 may actuate the regulator 28 to reduce or halt misting.

In use, the condenser fan 12 creates a horizontal airflow from the exterior sides of the condensing unit 16 towards the condenser coil 20 and discharges the air vertically up from the unit 16 through opening 22. This constant airflow captures or entrains the atomized water mist from the misting nozzles 62 of posts 60. The misting nozzles 62 may direct a fine mist or atomized water directly into the air without the use or contacting of water vanes or other structures through which turbulent air is passed prior to entering the filter assembly and condenser coil. As the mist flows towards the condensing unit, the majority of it evaporates, lowering the dry-bulb temperature. The portion of the mist that does not evaporate preferably should not reach the condenser coil because it usually contains calcium carbonate, also called limescale, and various other minerals. The limescale in particular would, after extensive use, coat the coil and decrease the heat transfer from the hot refrigerant gas to the airflow. Over time the decrease in heat transfer from the scale buildup would offset the heat transfer improvement from the mist and evaporation.

Figure 4:
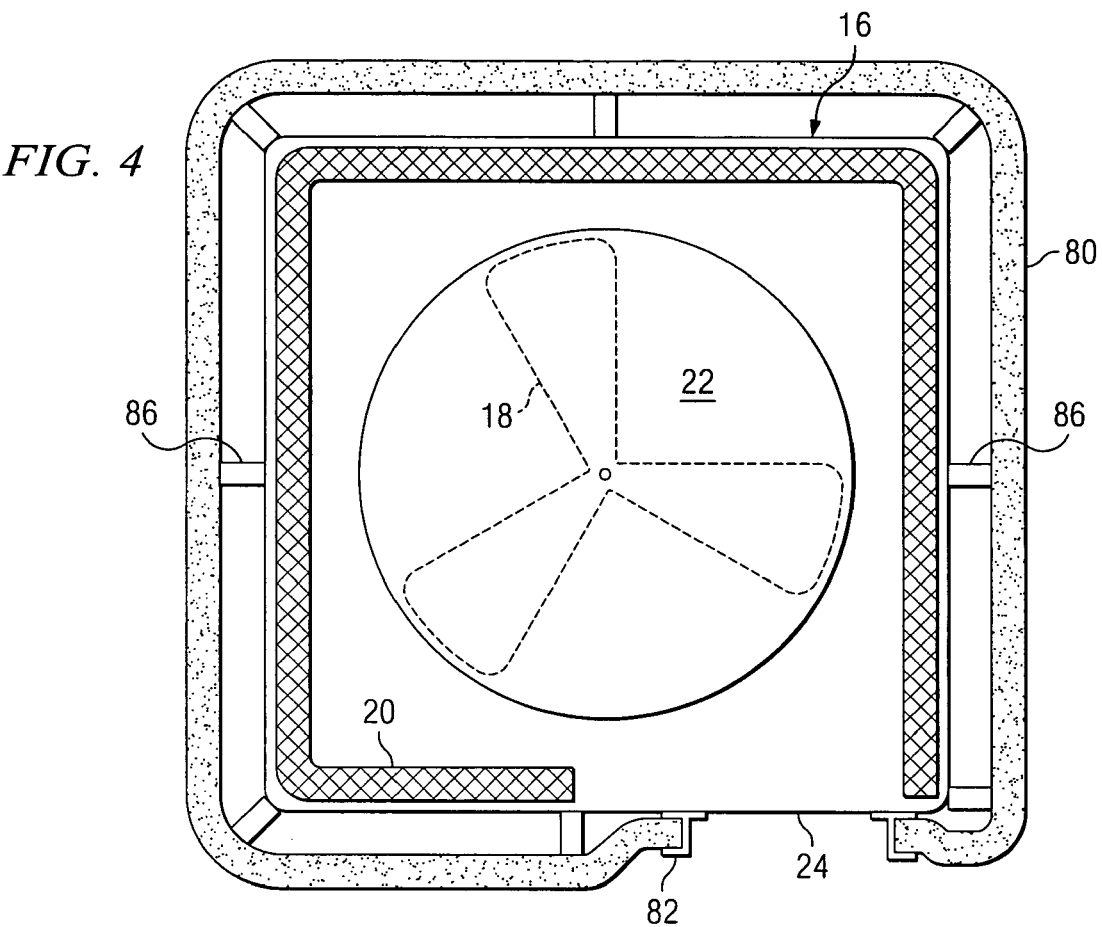
FIG. 4 is a top plan view of a condenser unit employing a stand-off filter assembly.

FIG. 4 show the top view of another embodiment of the basic condensing unit 16 with multiple filter stand-offs 86. These may be used to physically separate the filter 80 from the coil 20, providing an air gap and eliminate or reduce the possibility of the unevaporated water from the misters contacting the coil 20. The stand-offs 86 may also increase the total surface area of the filter 80.

Figure 5:
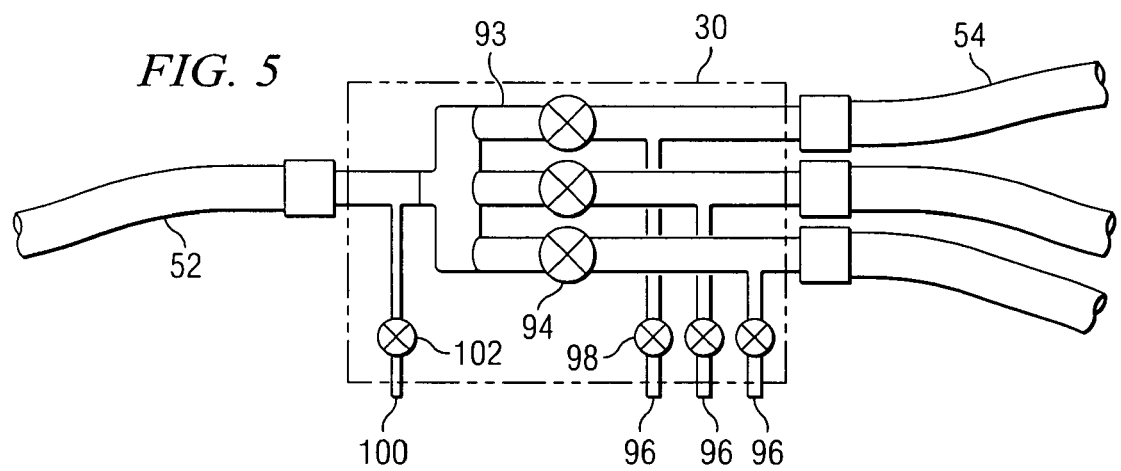
FIG. 5 illustrates a multiport regulator and controller.

FIG. 5 provides a detail view of a multi-port regulator 93, which may be used in place of the single-port regulator 28 on a single condensing unit, as described previously, or with multiple condensing units. The regulator 93 may be operated by means of the controller 30. In this particular embodiment, the regulator 93 has two or more valves 94, which may be solenoid valves or the like, for either staged misting on a single condensing unit or for on-off misting on multiple condensing units. This can be especially useful for larger individual residences with two or more condensing units located in the same area. It would also be useful for commercial buildings or apartments with several condensing units located in a given area. With multiple units, each discharge hose can serve the mister posts (not shown) for a given unit. For staged misting on a single unit, each outlet conduit 54 could supply a single post or a pair of posts.

The regulator 93 is also shown with a freeze-prevention feature. A drain or bleed valve assembly 96 may be provided with the multiple conduits of the regulator 93. Each conduit may be provided with its own drain valve assembly 96 having a valve 98 that may be normally closed, but upon loss of power or on freeze conditions is opened to allow the water in the mister posts and hoses drain out. For additional protection a dribble valve assembly 100 having a valve 102 can also be added on the water supply side. Under freeze conditions the valve 102 opens allowing just a small amount of water to drip out to prevent freezing. In regions of frequent hard freezes, it may be desirable to shut down and drain the entire system before cold weather arrives. The valve assemblies 96, 100 may be opened manually or actuated automatically by the controller 30 upon detected system or environmental conditions or upon instruction input.

Figure 6A:
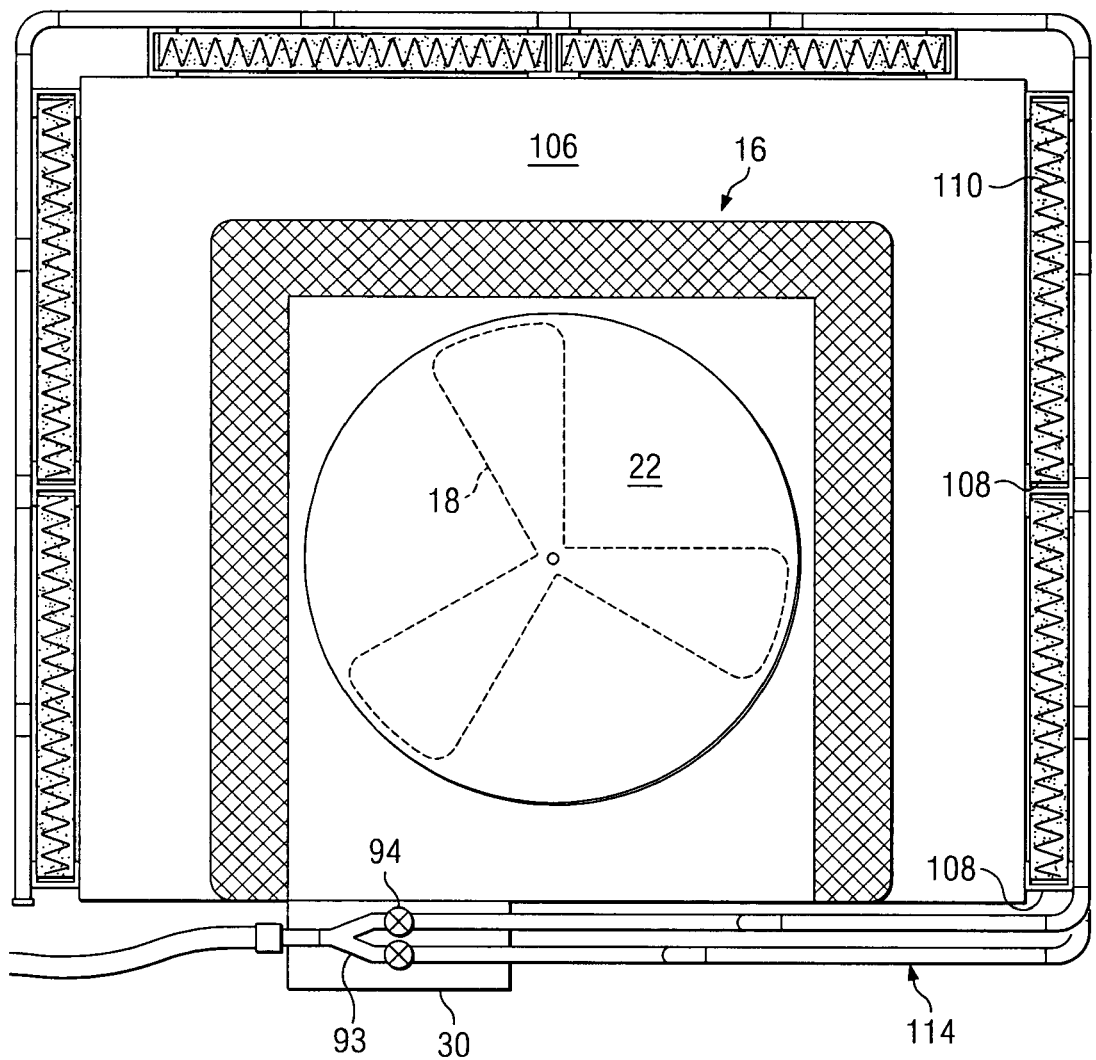
FIG. 6a is a top plan view of a condenser unit utilizing a housing with a filter element.
Figure 6B:
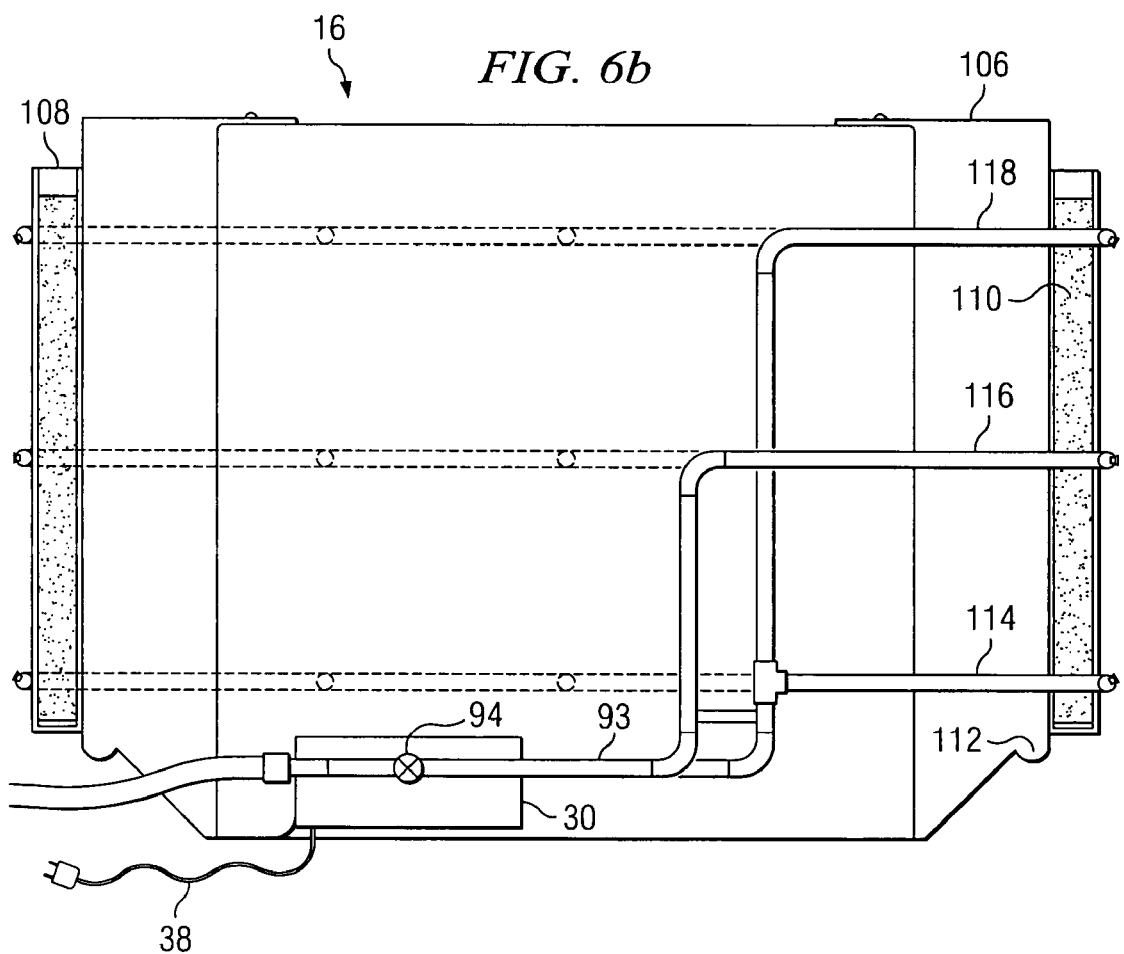

FIGS. 6a and 6b illustrate yet another embodiment of an air-cooling subsystem that utilizes a housing 106. The housing 106, which may form part of the filter assembly, may be rigid sheet metal, plastic or other material, can be used to facilitate smoothing the airflow downstream of the filter material and to provide rectangular filter racks 108 to allow the user to install standard size, rectangular framed filters 110. The frame of such filters 110 is typically formed from cardboard, plastic or similar material, and may include a wire or plastic support or guard overlaying the filter material layer. Such framed filters are readily known in the art for use with both residential and commercial air conditioning and heating units and are typically planar in shape and typically have a thickness of about ½ to 2 inches, although this may vary. The filter material used for the framed filters may be that or similar to that described for the filter element 80. The filters may be accordion-type filters, as well. Suitable commercially available framed filters include STRATADENSITY Premium Fiberglass Air Filters and DIRTDEMON Ultrastatic Pleated Air Filter. Six framed filters 110 are shown in FIG. 6a, but could be varied in number and sized to minimize pressure drop across the filters.

The shell or housing 106 may include a channel and drain 112 for collecting and draining unevaporated water from the filters 110. The embodiment of FIGS. 6a, 6b also employs a mister nozzle assembly 114 that may utilize hard-plumbed piping or conduit 116 instead of the flexible hoses and misting posts. The mister nozzle assembly 114 may be mounted or secured to the housing 106. The nozzle assembly 114 is shown further employing a multiport regulator 93 for staged misting. As shown, one valve of the regulator 93 controls coolant flow to a middle distribution pipe 116 and the other valve is connected to the upper and the lower distribution pipes 118. This configuration allows three different stages of misting: egs. 33%, 67%, or 100%.

Figure 7A:
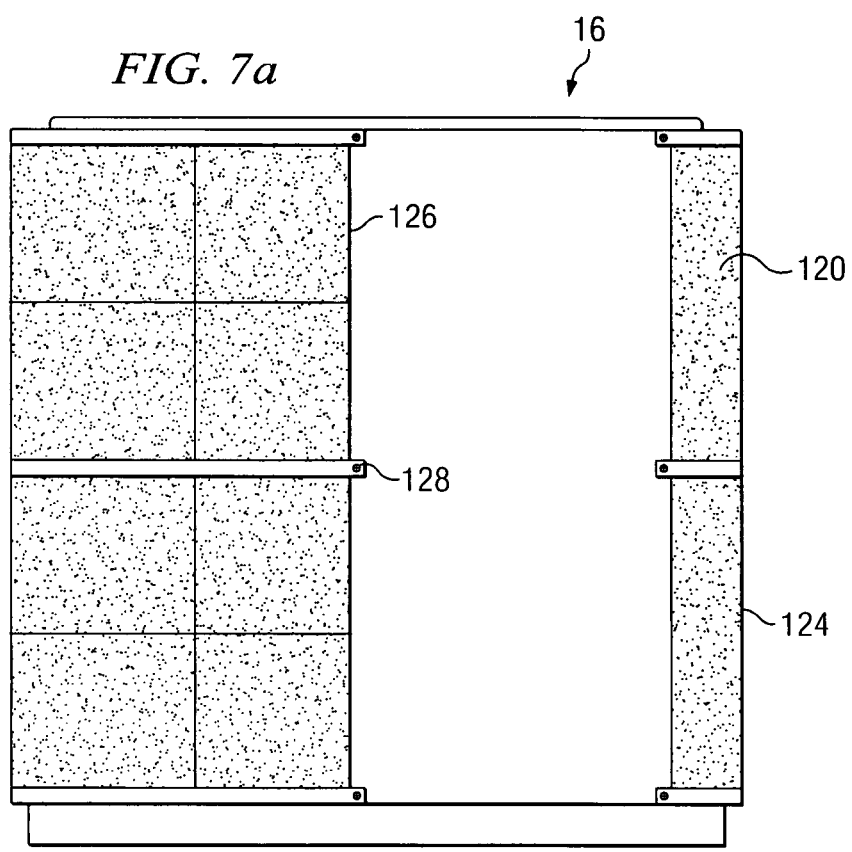
FIG. 7a is a side elevational view of a condenser unit employing a filter rack.
Figure 7B:
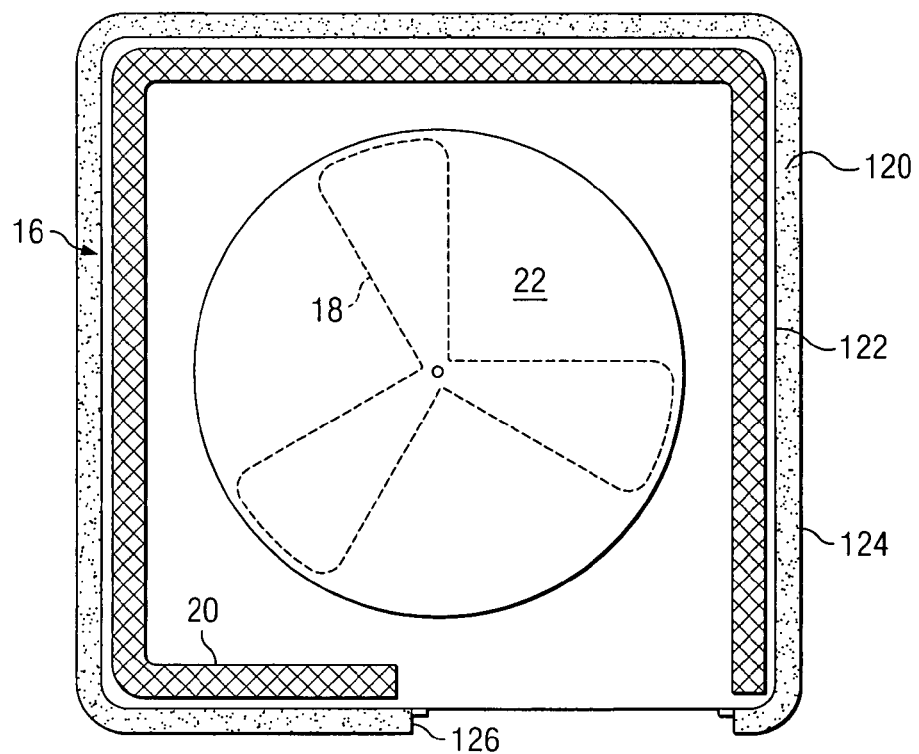

FIGS. 7a and 7b show still another embodiment employing the condensing unit 16 with a condenser coil 20. Around the coil 20 is provided a wire mesh filter rack 120, which forms part of the filter assembly. The filter rack 120 may be formed from two spaced apart, parallel layers of wire mesh 122, 124. The layers 122, 124 are spaced apart to receive either a non-framed or framed filter element. The wire mesh may have large openings and may be similar to the wire guard that is commonly employed on condensing units 16 to protect the coil 20 from physical damage. The two layers 122, 124 of wire mesh form an opening or slot 126 for the filter element, which is shown removed. The filter element may be inserted into the opening 126 from the side or top. The filter rack 120 may be held in place by brackets or fasteners 128 to the condensing unit 16.

As previously discussed, the controller 30 (FIG. 1) may be provided with various sensors 40, 42 for monitoring ambient conditions and system conditions. The monitored conditions, which may be one or more or a combination of such conditions, when they reach a preselected level, may cause the controller 30 to automatically start or stop misting operations to facilitate cooling of the air for use with the heat exchange unit 11. Additionally, the controller 30 may be used to adjust the degree of misting, including starting and stopping of the misting, so that light or heavy mist may be provided. This may be accomplished by regulating the degree of coolant flow through a single stage mister or by using staged misting, as discussed previously.

The air-cooling subsystems described herein may also be controlled either locally or remotely on the premises or from a remote, off-premise location. Such remote, off-premise control for air-cooling subsystems has been described previously in copending U.S. patent application No. 10/999,507, filed Nov. 29, 2004, which is a continuation of U.S. patent application No. 10/360,136, filed Feb. 7, 2003, now U.S. Pat. Ser. No. 6,823,684, which claims the benefit of U.S. Provisional Patent Application No. 60/354,979, filed Feb. 8, 2002, each of which is incorporated by reference in its entirety for all purposes.

Input or commands to the controller may be provided from such local or remote locations, such as from a home owner or dweller, building manager, power providing entity, including an electric company or power regulating entity, etc. Such input or commands may be provided locally or remotely, such as through a wire or wireless connection, which may be connected to a computer or other system. Two-way communication with the controller and the remote system may be provided.

In one embodiment, a power company, independent system operator or other power providing or regulating entity, could remotely actuate the air-cooling subsystem. This may be part of an implemented demand response management program. Such management may occur during peak electricity demand periods during high temperature days or hours. Incentives, such as rebates, reduced rates, credits or other financial savings may be provided by the entity to users of the air-cooling subsystem. In addition to turning off lights and other appliances, residential and commercial users may have the option of turning on the air-cooling subsystem to decrease power consumption in response to an alert or curtailment notice provided by the entities. The controller used with the subsystem may provide a signal or otherwise communicate with the remote location to indicate the user is eligible for such participation.

The controller may also receive real-time or dynamic electricity pricing input from a remote, off-site entity via a wire or a wireless connection to smart interval data recorder (IDR) electric meters. These meters are becoming more prevalent in regions where wholesale electricity prices fluctuate widely.

The invention allows smaller air conditioning units to be used for a given building or dwelling. Without the air-cooling subsystem, larger units are required to match the heat gain on the very hottest day that can reasonably be expected. This oversizing of the air conditioning unit for the majority of conditions may shorten the air conditioning cycle. This shorter air conditioning cycle may lead to significantly higher indoor humidity, which can facilitate mold growth. Also, shorter cycle time with more frequent starting and stopping increases wear and tear on the air conditioning unit. Smaller units would also allow more efficient cooling and reduce costs.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A heat transfer system comprising:
an air-cooled heat exchanger system having an evaporator, condenser, compressor and a fan for forcing air over a heat exchange surface for effecting heat transfer;
a mist generator having at least one nozzle for directing a stream of fine mist or atomized liquid coolant into the air, the mist generator being coupled to a supply of liquid coolant;
a controller for controlling the degree of mist or atomized coolant generated by the mist generator; and
a fiberglass filter element positioned between the at least one nozzle and the heat exchange surface for capturing droplets of liquid coolant, the at least one nozzle being spaced apart from the filter element for directing the stream directly into the air surrounding the filter element, and wherein
the controller includes a liquid sensor for sensing drainage of liquid coolant from the filter element, the controller adjusting the degree of mist or atomized liquid coolant generated by the mist generator in response to a preselected drainage of liquid coolant.

2. A method of transferring heat comprising;
providing an air-cooled heat exchanger system having a heat rejection section and a fan for directing air over a heat exchange surface for effecting heat transfer;
providing a mist generator having at least one nozzle for directing a stream of fine mist or atomized liquid coolant into the air, the mist generator being coupled to a supply of liquid coolant;
controlling the degree of mist or atomized coolant generated by the mist generator with a controller; and
positioning a fiberglass filter element between the at least one nozzle and the heat exchange surface for capturing droplets of liquid coolant, the at least one nozzle being spaced apart from the filter element;
and directing the stream of mist or atomized liquid coolant directly into the air surrounding the filter element without the use of water vanes, and wherein
the controller includes a liquid sensor for sensing drainage of liquid coolant from the filter element, the controller adjusting the degree of mist or atomized liquid coolant generated by the mist generator in response to a preselected drainage of liquid coolant.

3. A heat transfer system comprising:
an air-cooled heat exchanger system having an evaporator, condenser, compressor and a fan for forcing air over a heat exchange surface for effecting heat transfer;
a mist generator having at least one nozzle for directing a stream of fine mist or atomized liquid coolant into the air, the mist generator being coupled to a supply of liquid coolant;
a controller for controlling the degree of mist or atomized coolant generated by the mist generator; and
a filter element positioned between the at least one nozzle and the heat exchange surface for capturing droplets of liquid coolant, the at least one nozzle being spaced apart from the filter element for directing the stream directly into the air surrounding the filter element; and wherein
the controller includes a liquid sensor for sensing drainage of liquid coolant from the filter element, the controller adjusting the degree of mist or atomized liquid coolant generated by the mist generator in response to a preselected drainage of liquid coolant.

4. The heat transfer system of claim 3, wherein:
the filter element is flexible so that the filter element is conformable to non-planar shapes of the heat exchanger or heat exchange surface.

5. The heat transfer system of claim 3, further comprising:
filter racks for receiving the filter element; and wherein
the filter element is a framed filter element.

6. The heat transfer system of claim 3, wherein:
there are at least two conduits spaced apart about the perimeter of the heat exchanger, each conduit being supported by a non-fixed support so that the conduits may be positioned at selected locations.

7. The heat transfer system of claim 3, wherein:
the controller includes sensors for sensing at least one of ambient and system conditions and wherein the controller controls the mist generator in response to a sensed condition reaching a preselected level.

8. The heat transfer system of claim 3, wherein:
the controller is operable from a remote, off-premise location.

9. The heat transfer system of claim 8, wherein:
the controller is an on-premise controller and includes sensors for sensing at least one of ambient and system conditions and communicates such conditions to an off-premise location.

10. The heat transfer system of claim 3, wherein:
the filter element utilizes an electrostatic charge.

11. The heat transfer system of claim 3, wherein:
the mist generator is provided with a drainage valve for draining liquid coolant therefrom; and wherein
the controller actuates the drainage valve.

12. The heat transfer system of claim 3, wherein:
the mist generator is a staged generator that provides at least first and second staged operations wherein the level of mist or atomized liquid coolant generated in the first staged operation is different from that of the second staged operation.

13. A method of transferring heat comprising;
providing an air-cooled heat exchanger system having a heat rejection section and a fan for directing air over a heat exchange surface for effecting heat transfer;
providing a mist generator having at least one nozzle for directing a stream of fine mist or atomized liquid coolant into the air, the mist generator being coupled to a supply of liquid coolant;
controlling the degree of mist or atomized coolant generated by the mist generator with a controller; and
positioning a filter element between the at least one nozzle and the heat exchange surface for capturing droplets of liquid coolant, the at least one nozzle being spaced apart from the filter element;
and directing the stream of mist or atomized liquid coolant directly into the air surrounding the filter element without the use of water vanes; and wherein
the controller includes a liquid sensor for sensing drainage of liquid coolant from the filter element, the controller adjusting the degree of mist or atomized liquid coolant generated by the mist generator in response to a preselected drainage of liquid coolant.

14. The method of claim 13, wherein:
the mist generator includes at least two conduits spaced apart about the perimeter of the heat exchanger, each conduit having one or more nozzles and being supported by a non-fixed support so that the conduits may be positioned at selected locations about the perimeter.

15. The method of claim 13, wherein:
the controller includes sensors for sensing at least one of ambient and system conditions and wherein the controller controls the mist generator in response to a sensed condition reaching a preselected level.

16. The method of claim 13, wherein:
the controller is operable from a remote, off-premise location.

17. The method of claim 16, wherein:
the controller is an on-premise controller and includes sensors for sensing at least one of ambient and system conditions and communicates such conditions to an off-premise location.

18. The method of claim 13, wherein:
the controller operates the mist generator based upon real-time, recent cost, day-ahead or dynamic cost information relating to water or electrical power.

19. The method of claim 13, wherein:
the liquid coolant is non-potable water.

20. The method of claim 13, wherein:
the controller is an on-premise controller that communicates with an off-premise power providing entity to identify a user associated with the heat transfer system.

21. The method of claim 13, wherein:
the filter element is flexible and conforms to a non-planar shape of the heat transfer surface.

22. The method of claim 13, wherein:
positioning the filter element includes providing a filter rack for receiving the filter element, the filter element being a framed filter element, and wherein the filter element is adjacent to the heat exchange surface when received therein.

* * * * *